United States Patent Office 2,913,323
Patented Nov. 17, 1959

2,913,323

HERBICIDAL METHOD AND COMPOSITION EMPLOYING BIS(2-METHYL-5-ETHYLPYRIDINE) COPPER (II) CHLORIDE

Margaret D. Cameron, Beaumont, Tex., assignor to Monsanto Chemical Company, St. Louis, Mo., a corporation of Delaware No Drawing. Application October 24, 1956
Serial No. 617,907

2 Claims. (Cl. 71—2.5)

This invention relates to herbicides, and more particularly relates to a novel complex compound of a copper salt and to the use of this compound as a herbicide.

The compound, the provision and utility of which form the subject of this invention, is bis(2-methyl-5-ethylpyridine)-copper(II) chloride. I have made the unexpected discovery that this complex compound of copper possesses phytotoxic properties, and more particularly, that it is an excellent broadleaf contact herbicide having the peculiar property of a widespread toxicity toward a variety of broadleaf plants with the singular exception of cotton.

It is well known that various commercial herbicides such as 2,4-D may be substantially more toxic to broadleaf plants than to the narrowleaf plants, i.e., grasses. Advantage is taken of this characteristic by employing such herbicides as selective weed killers. Thus, a field planted with a grass such as wheat can be sprayed with a broadleaf-specific herbicides to produce kill of broadleaf weeds without interfering with the growth of the grassy crop.

The problem of chemical weeding of broadleaf weeds from broadleaf crops is more difficult. It is to be expected that the susceptibility of broadleaf crop plants to a herbicide toxic to broadleaf plants generally will be equal to or greater than the susceptibility of a broadleaf weed, and, generally, only empirical testing can determine what crops are resistant. Thus, it has been found that cotton is highly susceptible to 2,4-D, so that this herbicide is of no utility in the chemical weeding of cotton fields. Cotton is, in fact, susceptible to many broadleaf-phytotoxic compounds, and in the past it has been necessary to apply weed killers to cotton fields, where chemical weeding is employed, under precautionary conditions confining the herbicide spray to the base of the plant stalk, to avoid injury.

I have now made the discovery that bis(2-methyl-5-ethylpyridine)copper(II) chloride is an effective contact herbicide with a broad spectrum of phytotoxic activity toward broadleaf plants with the unique exception of cotton. This phytotoxic activity is highly surprising, for copper complex compounds are not generally herbicidal; and the phytotoxic activity of the present copper complex is of particular utility in that the compound is peculiarly useful as a selective herbicide for broadleaf weeds in stands of cotton.

Bis(2-methyl-5-ethylpyridine)copper(II) chloride is readily prepared by dissolving cupric chloride in the hot pyridine compound, whereupon the complex compound precipitates as the solution cools. Thus, e.g., 17 g. of cupric chloride dihydrate are dissolved in 50 ml. of hot 2-methyl-5-ethylpyridine. After cooling to room temperature, the deep blue crystalline precipitate is separated by filtration. Concentration of the filtrate yields additional precipitate; by recrystallization of the combined solids from aqueous ethanol containing a small amount of 2-methyl-5-ethylpyridine, there are obtained 21 g. of bis(2-methyl-5-ethylpyridine)-copper(II) chloride.

In an illustrative test procedure, the herbicidal activity of bis(2-methyl-5-ethylpyridine) was compared to that of a variety of other copper complex compounds. Areas containing ten-day to two-week old seedlings of each of a representative variety of broad- and narrowleaf plants were sprayed with solutions of the following test chemicals:

Bis(2-methyl-5-ethylpyridine)copper(II) chloride
Mono(2-methyl-5-ethylpyridine)copper(II) acetate
Bis(2-aminopyridine)copper(II) chloride
Mono(pyridine)copper(II) acetate
Bis(pyridine)copper(II) benzoate
Bis(t-butylamine)copper(II) chloride In 14 days the plots were observed and rated. It was found that, at rates as low as 3.5 lbs./acre (0.2% solution concentration), bis(2-methyl-5-ethylpyridine)copper (II) chloride produced complete kill of all broadleaf plants except cotton, whereas all of the grasses and broadleaf plants treated with any of the other closely related copper complex compounds listed above, even at rates of 9 lbs./acre (0.5% solution concentration), survived in healthy condition.

In applying the present compound as a herbicide, it is preferably admixed with an inert carrier to facilitate its application at the low rates needed for effective action. For example, a solution of bis(2-methyl-5-ethylpyridine)-copper(II) chloride may be prepared and the resulting herbicidal composition applied as a spray. Another form in which the present compound may be applied to plants is as a dust, in admixture with a solid powdered carrier such as clay, talc, pumice, or bentonite. Particularly effective as a means for the application of bis(2-methyl-5-ethylpyridine)copper(II) chloride to living plants are emulsions of the herbicidally toxic compound. An emulsion of the present copper complex compound may be prepared by dissolving it in an organic solvent such as acetone, adding a wetting agent and then treating the organic solution with water to form an oil-in-water emulsion. (The word "oil" is here used to designate any liquid insoluble in water.) Wetting agents which may be used to prepare such emulsions include, e.g., alkylbenzenesulfonates, polyalkylene glycols, salts of sulfated long-chain alcohols, sorbitan fatty acid esters, etc.; other suitable agricultural emulsifying and wetting agents are listed, e.g., in U.S. Department of Agriculture Bulletin E607. Rates of application of the present copper complex compound to produce herbicidal effects may be particularly low where this compound is applied as an emulsion. The rates at which the present compounds are employed, however, will depend, for example, on the method of application, the variety and age of the plants which it is desired to eradicate, etc.

In addition to its utility as a herbicide, bis (2-methyl-5-ethylpyridine)copper(II) chloride may also be used for a variety of other agricultural and industrial purposes, e.g., as a pigment, as a nutrient source, or as an agricultural fungicide. Thus, e.g., tomato plants immersed in solutions containing 10 to 100 parts per million of bis(2-methyl-5-ethylpyridine)copper(II) chloride and subsequently exposed to *Fusarium oxysporum f. lycopersici*, an incitant of tomato wilt, are completely protected from this disease organism by the chemical treatment. Sprayed with solutions of bis(2-methyl-5-ethylpyridine)copper-(II) chloride at sub-phytotoxic concentrations, tomato and cucumber plants are protected from the effects of subsequent inoculation with such leaf-spot causal organisms as *Stemphyllium solani* and *Colletotrichum lagenarium*. Bis(2-methyl-5-ethylpyridine)copper(II) chloride may also be employed on grasses, which are generally not susceptible to the phytotoxic effect of this copper compound, for the eradication of fungal diseases; thus, e.g., wheat plants infected with *Puccinia rubigo-vera tritici*, a wheat rust causal agent, are sprayed with a solution containing 5000 parts per million of bis(2-methyl-5-ethylpyridine)copper(II) chloride to effect substantial suppression of the rust infection. In applying the present compound as a fungicide, there may be utilized compositions wherein the active copper compound is associated with inert carriers as described above in the discussion of its use as a herbicide; or fungus-controlling compositions wherein the present copper complex compound is the active fungicidal ingredient may additionally contain other pest combatting materials, e.g., insecticides, bactericides, etc. It will be appreciated that when the present copper compound is employed as a selective herbicide for the eradication of broadleaf weeds from cereal grasses or from cotton stands, it may also contribute a fungus-combatting deposit to the crop plants which the application contacts.

While the invention has been described with particular reference to various preferred embodiments thereof, it will be appreciated that variations from the details given herein can be made without departing from the invention.

What I claim is:

1. A herbicidal composition comprising an oil-in-water emulsion containing a herbicidal concentration of bis(2-methyl-5-ethylpyridine)copper(II) chloride.

2. The method of eradicating undesired plants which comprises applying to living plants a phytotoxic quantity of bis(2-methyl-5-ethylpyridine)copper(II) chloride.

References Cited in the file of this patent

UNITED STATES PATENTS

| | | |
|---|---|---|
| 2,614,918 | Kaberg | Oct. 21, 1952 |
| 2,734,815 | Mowry et al. | Feb. 14, 1956 |
| 2,767,187 | Shrader et al. | Oct. 16, 1956 |

FOREIGN PATENTS

| | | |
|---|---|---|
| 701,179 | Great Britain | Dec. 16, 1953 |

OTHER REFERENCES

Vdovenko et al. in "Chemical Abstracts," vol. 48, col. 490(b), 1954.